United States Patent Office 3,830,857
Patented Aug. 20, 1974

---

3,830,857
PROCESS FOR THE MANUFACTURE OF FLUOROALKYL IODIDES
Hans Millauer, Frankfurt am Main, Germany, assignor to Farbwerke Hoechst Aktiengesellschaft, vormals Meister Lucius & Brüning, Frankfurt am Main, Germany
No Drawing. Filed Dec. 10, 1971, Ser. No. 206,919
Claims priority, application Germany, Dec. 12, 1970, P 20 61 355.2; Jan. 4, 1971, P 21 00 140.1
Int. Cl. C07c 17/20
U.S. Cl. 260—653.7          3 Claims

ABSTRACT OF THE DISCLOSURE

The invention relates to a process for the manufacture of fluoroalkyl iodides of the general formula $$R\text{—}CFI\text{—}CF_3,$$

wherein R represents fluorine or trifluoromethyl, by reacting at elevated temperature a mixture of a fluoroalkylene of the general formula $R\text{—}CF\text{=}CF_2$ wherein R has the above-mentioned meaning and iodine with hydrofluoric acid in the presence of inorganic oxyacids, their alkali metal or alkaline earth metal salts, halides or anhydrides.

---

The present invention relates to a process for the manufacture of fluoroalkyl iodides.

Various methods have been proposed for the manufacture of fluoroalkyl iodides, especially of pentafluoroethyl iodide ($CF_3CF_2I$) and 2-iodo-heptafluoropropane ($CF_3CFI\text{—}CF_3$).

Besides the decarboxylation of silver perfluoropropionate in the presence of an excess of iodine (silver salt method), which cannot be carried out on an industrial scale, several processes have become known which are based, in principle, on the addition of iodine monofluoride (IF) (hypothetical under the reaction conditions) on tetrafluoroethylene ($CF_2\text{=}CF_2$). Tetrafluoroethylene can be reacted, for example, with a mixture of one mole of iodine pentafluoride ($IF_5$) and 2 moles iodine to yield $CF_3CF_2I$ (cf. R. D. Chambers, W. K. R. Musgrave and J. Savory, Pr. Chem. Soc. (1961), page 113; British Pat. 885,007 (1961); U.S. Pat. 3,132,185 (1964)).

According to another process tetrafluoroethylene is reacted with a mixture of fluorine and iodine (cf. French Pat. 1,482,092).

Furthermore, a two stage process has been proposed wherein tetrafluoro-diiodoethane is first prepared from tetrafluoroethylene and iodine which is then further reacted with iodine pentafluoride to yield pentafluoroethyl iodide (H. J. Emeleus and R. N. Haszeldine, J. Chem. Soc. (1949), page 2948; Allied Chem., Netherlands Application 6612801; U.S. Pat. 3,283,020 (1962)).

In a known process for the manufacture of 2-iodo-heptafluoropropene, hexafluoropropene is reacted with a mixture of iodo-pentafluoride and iodine.

In all these processes elementary fluorine is required, mostly in a preceding reaction stage. This fluorine is difficult to handle, dangerous and expensive.

It has also been proposed to react hexafluoropropene with potassium fluoride and iodine to yield the desired 2-iodo-heptafluoropropene, but this reaction can only be carried out in the presence of a solvent (acetonitrile) and when the reaction was practised it was found that it was little suitable for industrial application owing to the fluctuations of yields (cf. J. Org. Chem. (1962), volume 27, page 1813; J. Amer. Chem. Soc. (1961), volume 83, page 2383)).

Another group of known processes is characterized in that a fluorination agent having a milder reaction than fluorine is allowed to act on a mixture of tetrafluoroethylene and iodine or on the adduct tetrafluoro-diiodoethane, for example sulfur tetrafluoride (U.S. Pat. 3,072,730), mercury difluoride (U.S. Pat. 3,140,320 and 3,133,125), lead tetrafluoride (Netherlands Application 6713608) or antimony trifluoride diochloride (U.S. Pat. 3,351,671).

The present invention provides a process for the manufacture of fluoroalkyl iodides of the general formula $$R\text{—}CFI\text{—}CF_3$$

wherein R represents fluorine or trifluoromethyl, which comprises reacting a mixture of a fluoroalkylene of the general formula $R\text{—}CF\text{=}CF_3$ wherein R represents fluorine or trifluoromethyl and iodine with hydrogen fluoride in the presence of oxyacids, their alkal metal or alkaline earth metal salts, halides or anhydrides, an oxyacid of an at least pentavalent halogen (Cl, Br, I), or pentavalent nitrogen, hexavalent sulfur, with exception of sulfuric acid and/or their salts.

Suitable oxyacids and their derivatives, defined in the following by the term oxygen containing compounds, in the process of the invention are chloric acid, perchloric acid, bromic acid, iodic acid, periodic acid, as well as their sodium, potassium, magnesium and calcium salts; furthermore $Cl_2O_7$ and $I_2O_5$, nitric acid, preferably nitric acid of at least 98% strength, sodium nitrate, potassium nitrate, magnesium nitrate, calcium nitrate, dinitrogen pentoxide, nitroxyl chloride and nitroxyl fluoride, sulfur trioxide, sulfuryl chloride, chlorosulfonic acid, fluorosulfonic acid or nitrosyl sulfuric acid. Preferred oxygen containing compounds are derivatives of oxyacids containing penta- or heptavalent halogens or pentavalent nitrogen, especially nitric acid ($HNO_3$), periodic acid, sodium or potassium iodate, furthermore potassium nitrate, sodium nitrate, potassium chlorate or sodium chlorate.

Suitable fluoroalkylenes are tetrafluoroethylene and preferably 1,1,2,2-tetrafluorodiiodoethane which is more easy to handle and hexafluoropropane. The molar ratio of fluoroalkylene to iodine can vary in the range of from 1:0.5 to 1:1.5, preferably 1:0.6 to 1:1.0. When 1,1,2,2-tetrafluorodiiodoethane is used further iodine need not be added.

The amount of oxygen containing compound required per mole of fluoroalkylene varies, of course, according to the nature of the characteristic element (halogen, nitrogen or sulfur) and the degree of oxidation. In general, for each exchanged equivalent of iodine one oxidation equivalent is required. For one mole of fluoroalkylene to be reacted the following amounts of oxygen containing compound are suitably used: about 0.2 to 0.25 mole in the case of halogen(V) compounds, about 0.15 to 0.2 mole in the case of halogen(VII) compounds, 0.25 to 0.4 mole with nitrogen(V) compounds, 0.5 to 0.6 mole with sulfuryl chloride or fluoride, and about 1 mole in the case of nitrosyl sulfuric acid, chlorosulfonic acid, fluorosulfonic acid, or sulfur trioxide.

An excess of oxygen containing compound beyond the defined proportions may be of advantage with regard to a better yield. The excess may amount to 10 to 50%, preferably 10 to 30% and more preferably up to 10%.

Hydrogen fluoride is used in an amount of 2 to 40 moles, preferably 3 to 20 moles, per each mole of fluoroalkylene. It should be used in an amount of at least 18 parts by weight, preferably at least 19 parts by weight, for each part by weight of water present or formed in the reaction mixture. Higher amounts of hydrogen fluoride than 40 moles per mole of fluoroalkylene are also possible, but do not involve any advantage.

The reaction is carried out at a temperature above 50° C., in general in the range of from 80 to 200° C., preferably 100 to 170° C. The reaction pressure esentially depends on the vapor pressure of hydrogen fluoride at the reaction temperature, on the gaseous reaction products formed and thus on the reaction volume. On the whole, the reaction pressure is not critical and may vary of from 3 to about 100 atmospheres, depending on the reaction conditions. In general, the reaction pressure varies of from about 8 to about 60 atmospheres.

To carry out the process of the invention the starting products may be placed first into a pressure resistant vessel and then heated at the reaction temperature while stirring. The reaction vessel may be made of any material that is resistant to 90 to 100% hydrofluoric acid at a temperature of up to 200° C. and withstands pressure, for example stainless steels.

When the reaction is terminated after 1 to 20 hours, preferably 2 to 6 hours, the pressure is released at elevated temperature, the pentafluoroethyl iodide formed is separated from the hydrogen halide by rectification or a water wash, optionally dried and further purified by fractional distillation, if desired. The excess of hydrogen fluoride separated from the pentafluoroethyl iodide by distillation may be reused for further reactions.

Alternatively, the process of the invention can be carried out in a manner such that only part of the reactants or one component, for example HF, is first introduced into the reaction vessel and the remainder or the other components are then added at the reaction temperature.

The process of the invention can readily be carried out in continuous manner.

The process of the invention represents an unexpected progress because the fluoroalkyl iodides, which are used as telogens for the telomerization of tetrafluoroethylene and/or hexafluoropropylene to long chain perfluoroalkyl iodides and, hence, constitute valuable intermediates could hitherto only be prepared from compounds that are difficult to obtain or difficult to handle. The fact that elementary fluorine can now be replaced by hydrogen fluoride which has a much higher boiling point and is much less corrosive and which is being used on an industrial scale for quite a while, constitutes a considerable progress in the art.

The following examples illustrate the invention.

EXAMPLE 1

117 grams (0.50 mole) of tetrafluorodiiodoethane ($CF_2I$—$CF_2I$), 19.8 grams (0.10 mole) of sodium iodate, and 200 grams (10 moles) of hydrogen fluoride were introduced into a 1 liter autoclave made of stainless steel and provided with magnetic stirrer and electric heating and the reaction mixture was heated for 5 hours at 150° C. while stirring. The pressure in the autoclave rose to 40 atmospheres gauge. The autoclave was then allowed to cool to 130° C. and the volatile reaction products slowly left the autoclave without stirring. The gases were passed first through a wash bottle containing 800 milliliters of water, then through a wash bottle containing 20% aqueous potassium hydroxide solution and finally through a drying tower charged with granular calcium chloride into a trap cooled at −78° C. When the pressure of the autoclave was fully released, the washing and drying vessels were purged with a weak nitrogen current which was then also passed through the trap cooled at −78° C. In the cooling trap 96 grams of condensate were obtained.

According to chromatographic analysis the condensate consisted of about 95% by volume of pentafluoroethyl iodide, 4% by volume of tetrafluoroethylene and 0.5% by volume of higher boiling components. By fractional distillation of the condensate 90 grams of pentafluoroethyl iodide were obtained, corresponding to 73 mole percent, calculated on the $CF_2I$—$CF_2$ used.

EXAMPLE 2

177 grams (0.50 mole) of tetrafluorodiiodoethane, 17.1 grams (0.75 mole) of periodic acid ($H_5IO_6$) and 200 grams (10 moles) of hydrogen fluoride were introduced into the autoclave described in Example 1 and the reaction mixture was stirred for 5 hours at 150° C. The final pressure in the autoclave amounted to 40 atmospheres gauge. The reaction mixture was worked up as described in Example 1. 109 grams of a crude product were obtained, consisting of approximately 98% by volume of pentafluoroethyl iodide and 2% by volume of tetrafluoroethylene according to gas chromatographic analysis. By fractional distillation, 105 grams of pentafluoroethyl iodide were obtained, corresponding to 85.5 mole percent calculated on the $CF_2I$—$CF_2$ used.

EXAMPLE 3

177 grams (0.50 mole) of tetrafluorodiiodoethane, 9.4 grams (0.088 mole) of sodium chlorate and 200 grams (10 moles) by hydrogen chloride were introduced into the autoclave used in Example 1 and the reaction mixture was stirred for 5 hours at 150° C., whereby the pressure rose to at most 39 atmospheres gauge. The reaction mixture was processed as described in Example 1 and 68 grams of crude product were obtained which, according to gas chromatographic analysis, consisted of about 85% by volume of pentafluoroethyl iodide, 5% by volume of tetrafluoroethylene, 6% by volume of 1,1,2,2-tetrafluoro-1,2-dichloroethane, 1% by volume of pentafluorochloroethane and about 3% by volume of higher boiling constituents. From the mixture 55 grams (45 mole percent calculated on $CF_2I$—$CF_2I$) of pentafluoroethyl iodide were obtained by fractional distillation.

EXAMPLE 4

177 grams (0.50 mole) of tetrafluorodiiodoethane, 10.5 grams (0.163 mole) of nitric acid of 98% strength and 200 grams (10 moles) of hydrogen fluoride were introduced into the autoclave used in Example 1 and the reaction mixture was stirred for 5 hours at 150° C. whereby the pressure rose to 41 atmospheres gauge. The reaction mixture was worked up as described in Example 1. 100 grams of crude product were obtained which, according to gas chromatographic analysis, consisted of about 92% by volume of pentafluoroethyl iodide, about 8% by volume of nitrogen oxides (mainly $N_2O$) and 0.5% by volume of higher boiling constituents. From the mixture 95 grams of pentafluoroethyl iodide were obtained, corresponding to 77 mole percent calculated on the $CF_2I$—$CF_2$ used.

EXAMPLE 5

177 grams (0.50 mole) of tetrafluorodiiodoethane, 34.0 grams (0.254 mole) of sulfuryl chloride and 200 grams (10 moles) of hydrogen fluoride were introduced into the autoclave used in Example 1, the reaction mixture was heated to 150° C. and maintained at said temperature for 5 hours while stirring. The pressure rose to 50 atmospheres gauge. The reaction mixture was worked up as described in Example 1. 103 grams of crude product were obtained which, according to gas chromatographic analysis, consisted of about 97% by volume of pentafluoromethyl iodide, 1% by volume of tetrafluoroethylene and 2% by volume of 1,1,2,2-tetrafluoro - 1 - iodo - 2 - chloroethane. From the mixture 100 grams of pentafluoroethyl iodide were obtained, corresponding to 81 mole percent, calculated on the $CF_2I$—$CF_2I$ used.

EXAMPLE 6

177 grams (0.50 mole) of tetrafluorodiiodoethane, 55 grams (0.55 mole) of fluorosulfonic acid and 200 grams (10 moles) of hydrogen fluoride were heated to 160° C. and maintained at said temperature for 5 hours. The pressure rose to at most 40 atmospheres gauge. The reaction mixture was worked up and 67 grams of crude product were obtained which, according to gas chromatographic analysis, consisted of about 87% by volume of pentafluoroethyl iodide, 11% by volume of tetrafluoroethylene and 2% by volume of higher boiling constituents. About 47 mole percent of pentafluoroethyl iodide were obtained, calculated on the tetrafluorodiiodoethane used.

EXAMPLE 7

An autoclave made of stainless steel and provided with a magnetic stirrer and electric heating was charged with 22.8 grams (0.10 mole) of periodic acid ($H_5IO_6$), 85 grams (0.33 mole) of iodine, 100 grams (0.66 mole) of perfluoropropene and 200 grams (10 moles) of hydrogen fluoride and the reaction mixture was heated for 5 hours at 150° C. while stirring. The pressure rose to about 40 atmospheres gauge.

After cooling to 100° C. the gaseous reaction products were discharged from the autoclave and passed through a wash bottle containing 800 milliliters of water, an empty vessel, a washing vessel containing 100 milliliters of water, a trap cooled at 0° C., a drying tower filled with $CaCl_2$ and a trap cooled at −78° C. The crude product condensed in the washing vessels and the traps was combined, freed from washing liquid by decantation and drying with powdered calcium chloride and purified by fractional distillation. 132 grams of 2-iodo-heptafluoropropane were obtained, corresponding to a yield of 68 mole percent, calculated on the amount of perfluoropene used.

EXAMPLE 8

The autoclave used in Example 1 was charged with 32.0 grams (0.50 mole) of concentrated nitric acid, 153 grams (0.60 mole) of iodine, 150 grams (1.0 mole) of perfluoropropene and 200 grams (10 moles) of hydrogen fluoride. The reaction mixture was heated for 3 hours at 160° C. while stirring and worked up as described in Example 7. 223 grams of 2-iodo-heptafluoropropene were obtained, corresponding to a yield of 75 mole percent, calculated on the perfluoropropene used.

EXAMPLE 9

The autoclave used in Example 1 was charged with 42.5 grams (0.50 mole) of sodium nitrate, 140 grams (0.55 mole) of iodine, 150 grams (1.0 mole) of perfluoropropene and 200 grams (10 moles) of hydrogen fluoride and the reaction mixture was heated for 5 hours at 150° C. It was then worked up as described in Example 7. 128 grams of 1-iodo-heptafluoropropane were obtained, corresponding to a yield of 43 mole percent, calculated on the perfluoropropene used.

What is claimed is:

1. A process for the manufacture of fluoroalkyl iodides of the general formula R—CFI—CF$_3$ in which R represents fluorine or trifluoromethyl, which comprises reacting a mixture of a fluoroalkylene of the formula $$R—CF=CF_2$$

in which R represents fluorine or trifluoromethyl and iodine with hydrogen fluoride in the presence of an oxidizing compound selected from the group consisting of chloric acid, perchloric acid, bromic acid, iodic acid, periodic acid, nitric acid, their alkali metal salts or alkaline earth metal salts, dihloroheptoxide and diiodopentoxide, dinitrogen pentoxide, nitroxyl chloride and nitroxyl fluoride, sulfurtrioxide, sulfuryl chloride, chlorosulfonic acid, fluorosulfonic acid and nitrosyl sulfuric acid at a temperature between substantially 50° C. and 200° C. and at a pressure between 3 and 100 atmospheres absolute, the molar ratio HF/fluoroalkylene being between 2 and 40 and the molar ratio $I_2$/fluoroalkylene being between 0.5 and 1.5.

2. The process of claim 1, wherein the reaction is carried out at a temperature in the range of from 80 to 200° C.

3. The process of claim 1, wherein 1,1,2,2-tetrafluorodiiodoethane is used instead of the mixture of tetrafluoroethylene and iodine.

References Cited

UNITED STATES PATENTS 3,523,140   8/1970   Cammarata et al. __ 260—653.6
3,644,544   2/1972   Cammarata et al. __ 260—653.7

DANIEL D. HORWITZ, Primary Examiner

U.S. Cl. X.R.

260—653.6